United States Patent
Ohwa

(10) Patent No.: US 9,936,140 B2
(45) Date of Patent: Apr. 3, 2018

(54) IMAGE CAPTURING APPARATUS, CONTROL METHOD FOR THE SAME, AND STORAGE MEDIUM

(71) Applicant: CANON KABUSHIKI KAISHA, Tokyo (JP)

(72) Inventor: Yasushi Ohwa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 15/041,436

(22) Filed: Feb. 11, 2016

(65) Prior Publication Data
US 2016/0241792 A1    Aug. 18, 2016

(30) Foreign Application Priority Data
Feb. 16, 2015  (JP) .................. 2015-027944

(51) Int. Cl.
  *H04N 5/232* (2006.01)
  *H04N 5/341* (2011.01)
  *H04N 5/262* (2006.01)
  *H04N 3/14* (2006.01)

(52) U.S. Cl.
  CPC ..... *H04N 5/23296* (2013.01); *H04N 5/23293* (2013.01); *H04N 3/1562* (2013.01); *H04N 5/2628* (2013.01); *H04N 5/341* (2013.01)

(58) Field of Classification Search
  None
  See application file for complete search history.

(56) References Cited

U.S. PATENT DOCUMENTS

| 4,288,818 A | * | 9/1981 | Poetsch | H04N 3/38 348/97 |
| 4,891,702 A | * | 1/1990 | Nakayama | H04N 7/0122 348/561 |
| 5,812,189 A | * | 9/1998 | Kimura | G02B 7/102 348/240.99 |

FOREIGN PATENT DOCUMENTS

| JP | 2003-323333 A | 11/2003 |
| JP | 2012-222643 A | 11/2012 |

* cited by examiner

*Primary Examiner* — Roberto Velez
*Assistant Examiner* — Quan Pham
(74) *Attorney, Agent, or Firm* — Cowan, Liebowitz & Latman, P.C.

(57) ABSTRACT

An image capturing apparatus comprises an image capturing unit, a memory configured to store the image signal, a writing unit configured to write the image signal to the memory, a readout unit configured to read out at least a partial region of the image signal, a display unit configured to perform live-view display of an image, and a control unit configured to perform control for each frame of the image signal, wherein the control unit sets, when electronic zoom is in operation, the delay time such that the operation of the writing unit writing the image signal to the memory and the operation of the readout unit reading out the image signal from the memory end within a period of one frame of the image signal, regardless of the reading region changing.

7 Claims, 6 Drawing Sheets

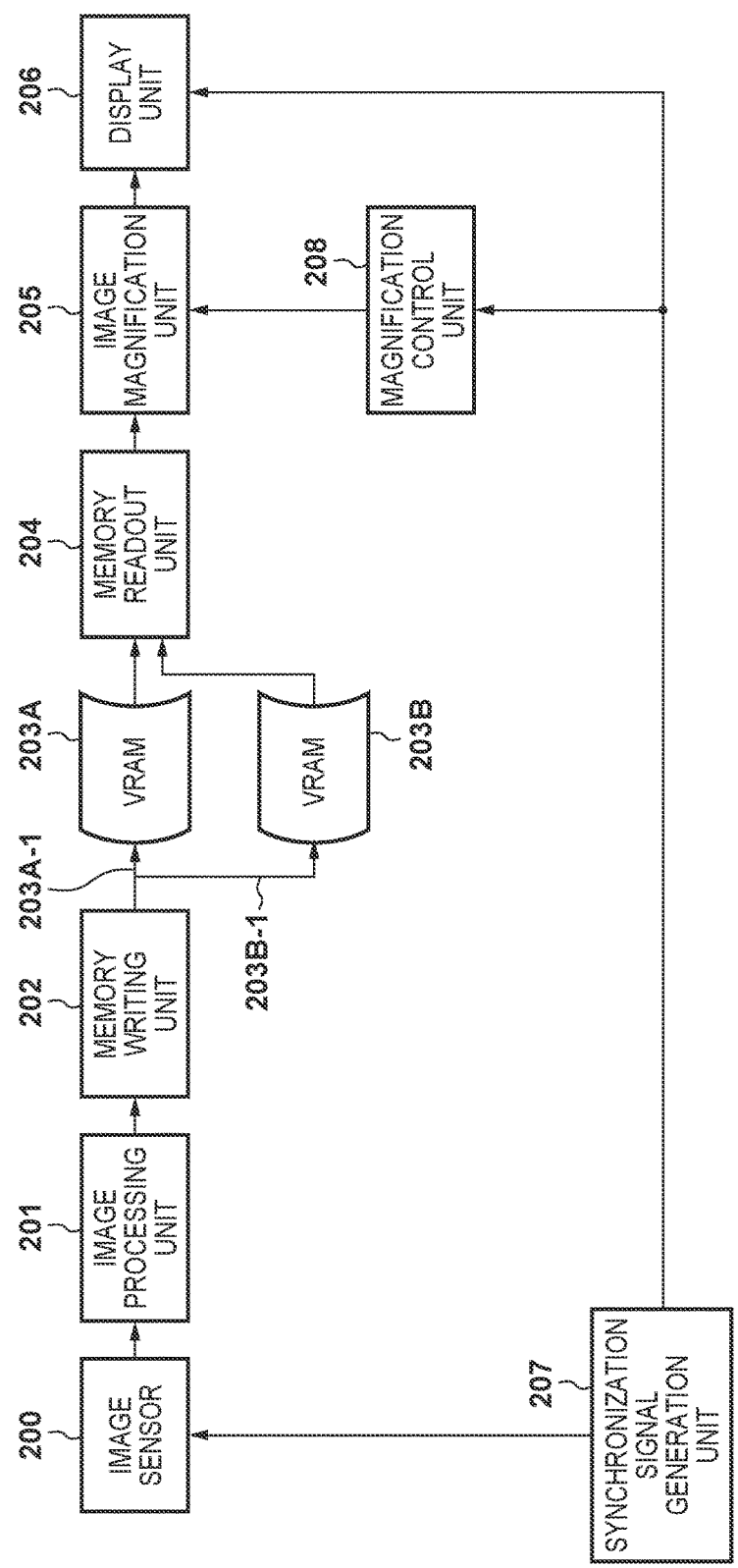

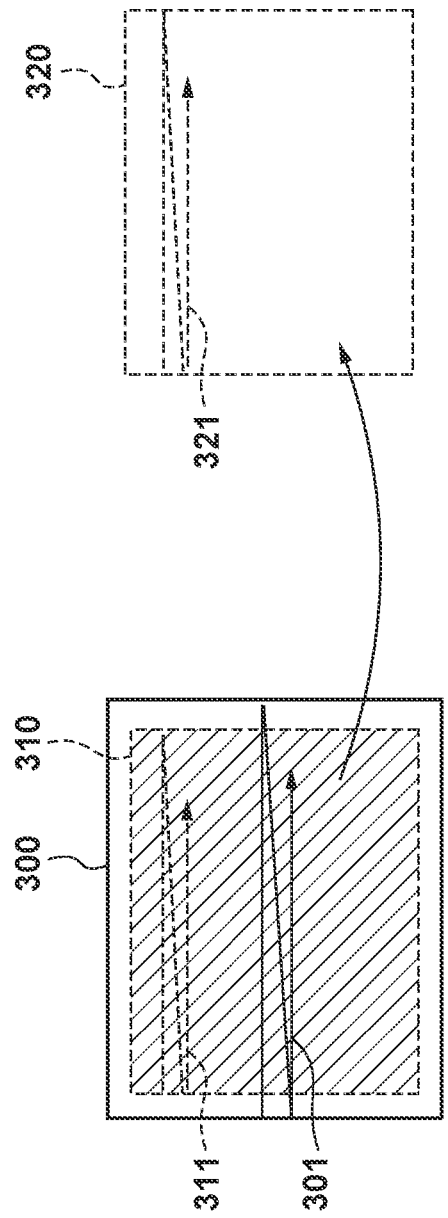

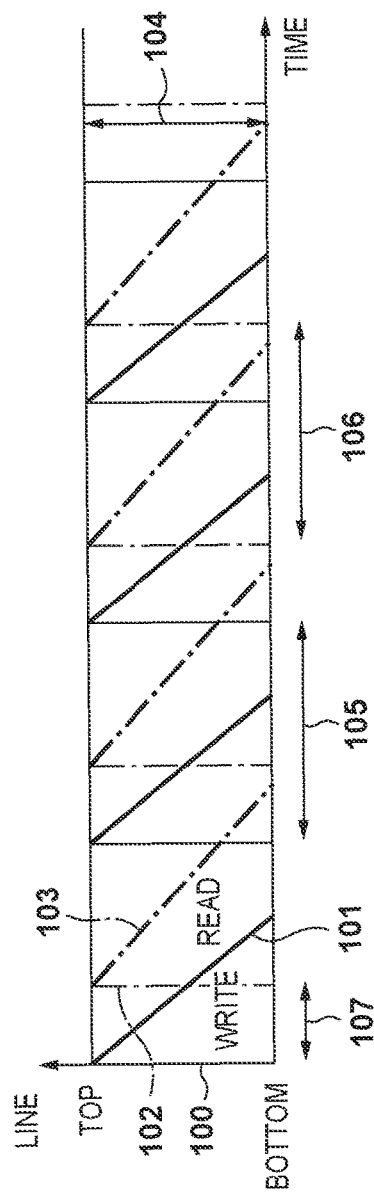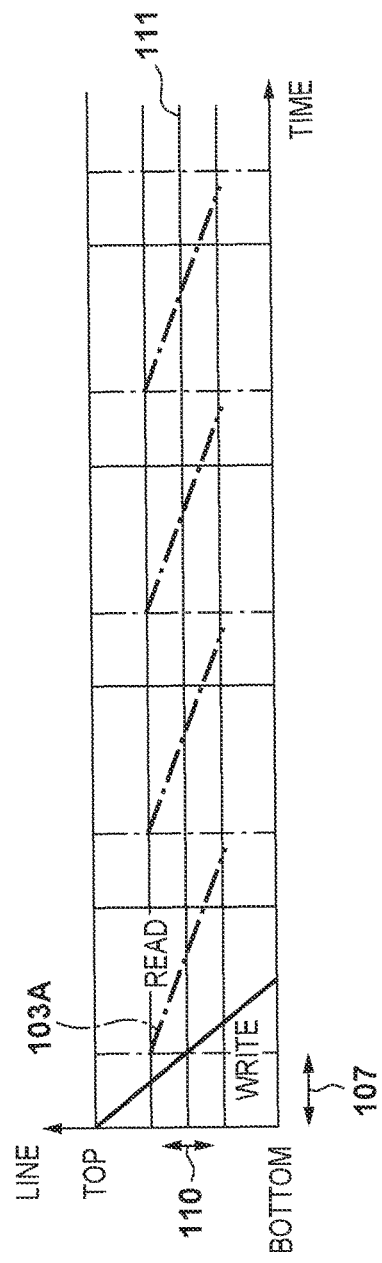

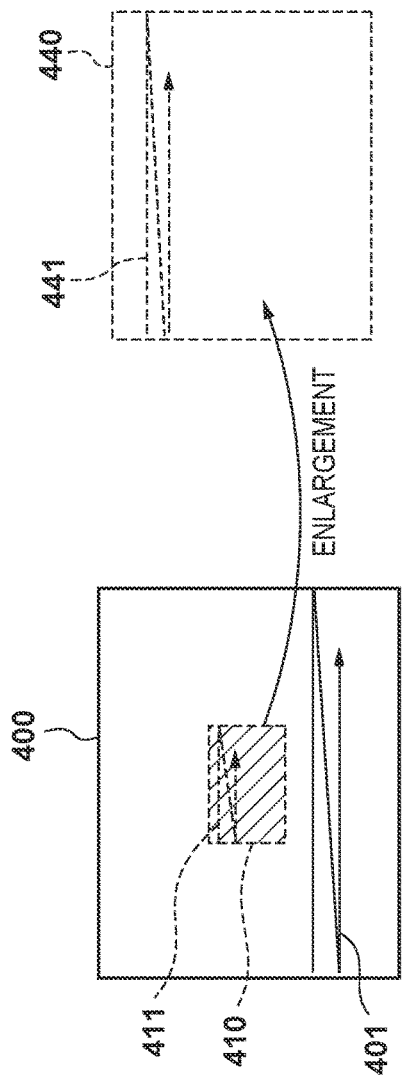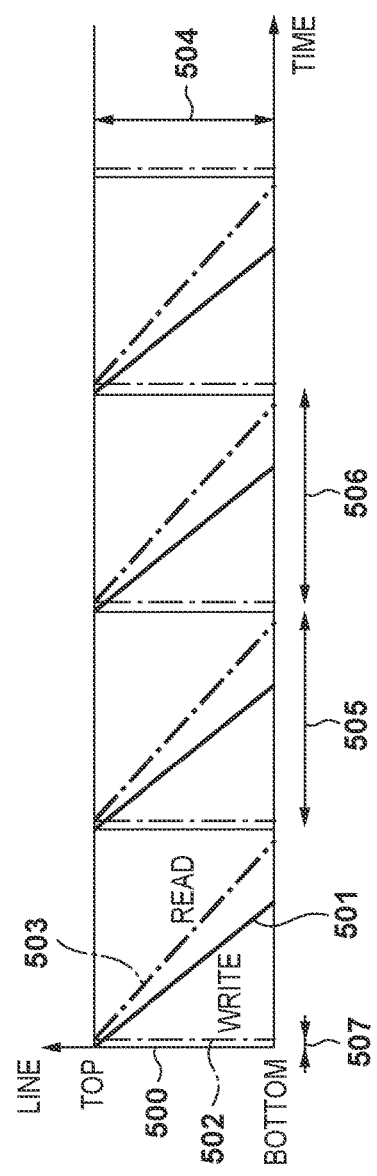

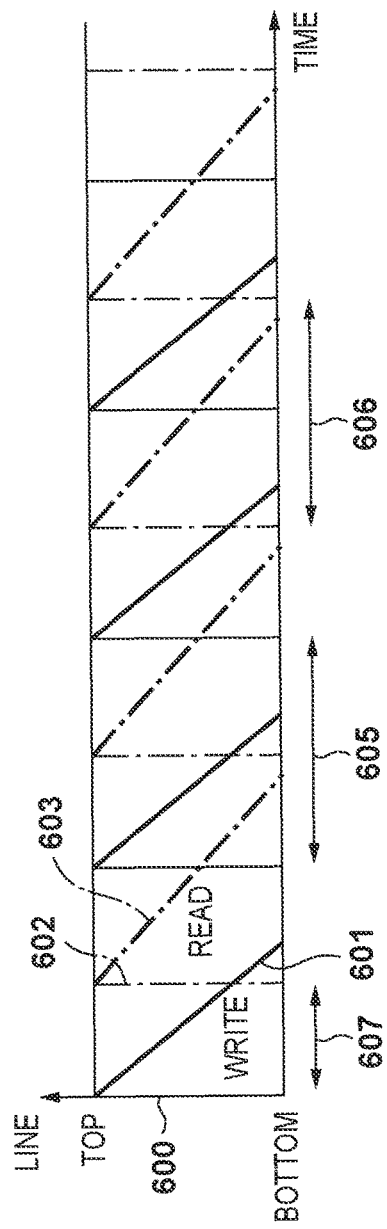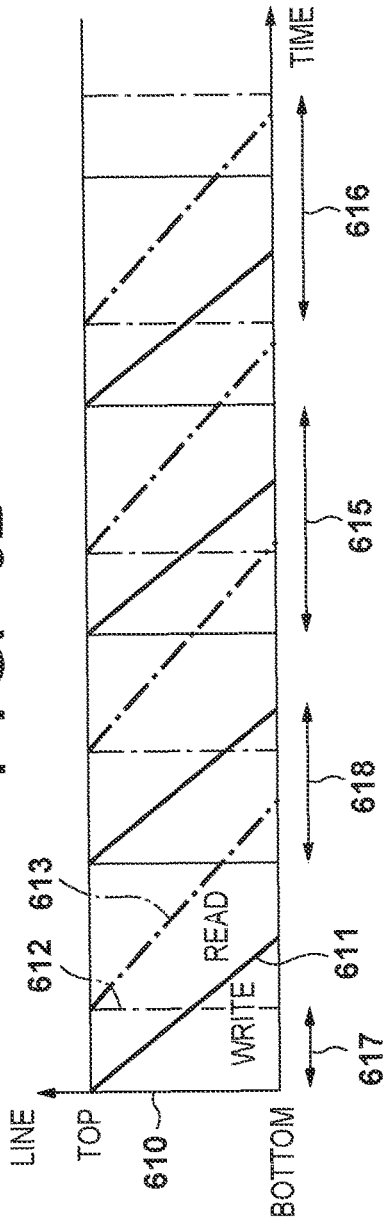

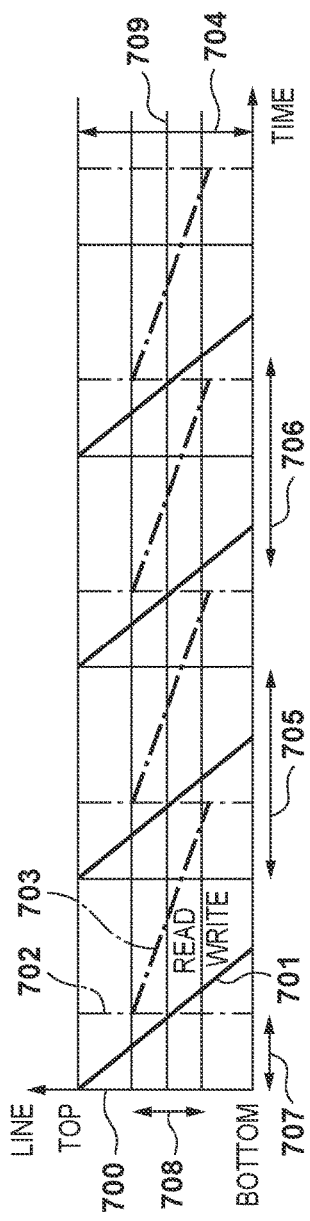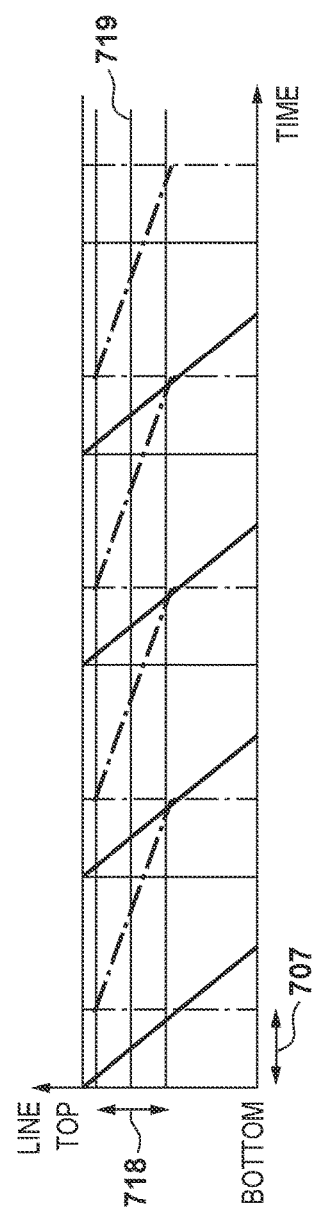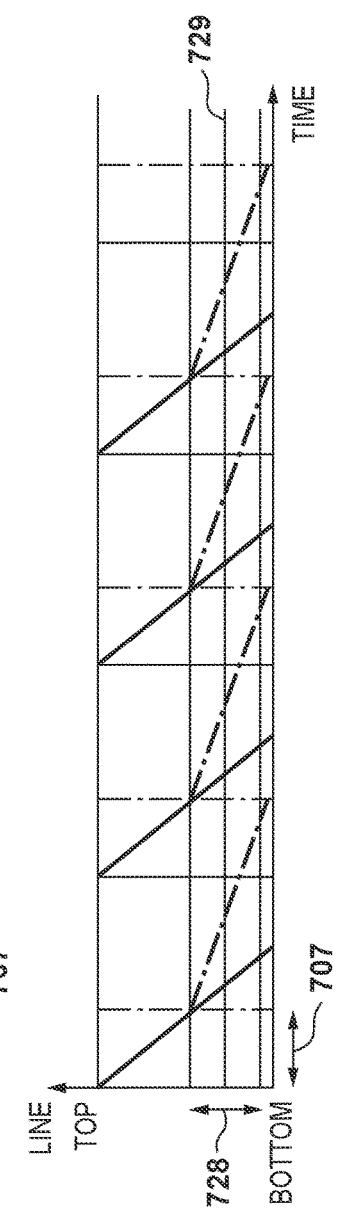

IMAGE CAPTURING APPARATUS, CONTROL METHOD FOR THE SAME, AND STORAGE MEDIUM

BACKGROUND OF THE INVENTION

Field of the Invention

The present invention relates to display control technology in a case where electronic zoom is performed in an image capturing apparatus.

Description of the Related Art

Conventionally, in the case where a captured image or an image transmitted from outside is displayed in real time, there is an issue of it being difficult to track and display the motion of a fast subject when the timing for display is delayed relative to the timing for image capture or image reception. In response to this issue, technology has been proposed that reduces the delay in timing for display (display delay) with respect to the input of an image.

For example, Japanese Patent Laid-Open No. 2012-222643 discloses technology for displaying a transmitted image with little delay. The following processing is performed in Japanese Patent Laid-Open No. 2012-222643. That is to say, a first calculation unit calculates an allowable delay time that denotes a delay time that is allowable when writing cannot be ended within a predetermined required time from the writing start time at which image writing starts. A second calculation unit calculates the minimal required time needed from the writing start time of the image written with a delay time that is less than or equal to the allowable delay time until the timing for display at which display of the image starts. A comparison unit compares the allowable delay time and the required time, and a display adjustment unit adjusts the timing for display based on the comparison results from the comparison unit. Then, a display control unit causes the image to be displayed in synchronization with the adjusted timing for display. Thus, such processing reduces the display delay.

Also, technology regarding overtake control is proposed as a memory access method that reduces display delay. In overtake control, memory access control is performed by applying a predetermined delay amount so that the readout of data does not overtake the writing of data to the same memory region. Accordingly, it is possible to reduce the delay amount caused by accessing the memory.

For example, in Japanese Patent Laid-Open No. 2003-323333, in a case where data is written to and read out from the same memory region, a predetermined delay amount is applied such that the readout of data does not overtake the writing of data, and if the two processes are not within a predetermined range, an access alarm is output and the readout is temporarily stopped. Accordingly, control is performed such that readout does not overtake writing.

In a case where capture, recording, and live-view display of moving images is performed with the image capturing apparatus, there is a need to maintain a fixed frame rate for image capture, recording, and live-view display. For example, in the case of capturing an object in which the size, location, or the like changes over time, if the frame rate of live-view display changes, smooth motion of the recorded images and the subject on the live-view screen is inhibited. For this reason, there is a possibility that the recorded image and the live-view image will appear to be unnatural. In Japanese Patent Laid-Open No. 2012-222643, a reduction in display delay is realized by adjusting the timing for display, but in the case where fixed frame rates are to be maintained for the above-described reasons, it is difficult to apply the technology disclosed in Japanese Patent Laid-Open No. 2012-222643.

Also, in a case where electronic zoom is used to display an enlarged portion of an image during image capture, a partial region of a written image is cut out and read out. For this reason, if data is written to and read out from the same memory region in the case where electronic zoom is used, there are cases where the timing at which readout is possible is later than in the case where electronic zoom is not used. In the case where this delay exceeds the predetermined delay amount between the timing for writing and readout set by the normal overtake control technology, there are cases where the live-view display is unstable. In other words, there are cases where a portion of the image is not in time for updating of the frame and the image read out for the previous frame is displayed for two frames, and thus there are cases of the quality of the live-view display being impaired.

SUMMARY OF THE INVENTION

The present invention has been made in light of the above issues and is technology that realizes, in a case where image capture is performed during live-view display, display delay in a case where electronic zoom is used is reduced and stable image display is realized.

According to a first aspect of the present invention, there is provided an image capturing apparatus comprising: an image capturing unit configured to output, at a predetermined framerate, an image signal obtained by image capture; a memory configured to store the image signal; a writing unit configured to write the image signal to the memory; a readout unit configured to, in a case where a readout region of the image signal written in the memory changes according to electronic zoom, read out at least a partial region of the image signal; a display unit configured to perform live-view display of an image based on the image signal read out by the readout unit; and a control unit configured to perform control, for each frame of the image signal, such that an operation of the readout unit reading out the image signal stored in the memory starts after a fixed delay time from a timing at which an operation of the writing unit writing the image signal to the memory starts, wherein the control unit sets, when electronic zoom is in operation, the delay time such that the operation of the writing unit writing the image signal to the memory and the operation of the readout unit reading out the image signal from the memory end within a period of one frame of the image signal, regardless of the reading region changing.

According to a second aspect of the present invention, there is provided a control method for an image capturing apparatus comprising an image capturing unit configured to output, at a predetermined framerate, an image signal obtained by image capture and a memory configured to store the image signal, the method comprising: writing the image signal to the memory; reading out, in a case where a reading region of the image signal written in the memory changes according to electronic zoom, at least a partial region of the image signal; performing live-view display of an image based on the image signal read out in the reading out; and performing control, for each frame of the image signal, such that an operation of reading out the image signal stored in the memory in the reading out starts after a fixed delay time from a timing at which an operation of writing the image signal to the memory in the writing starts, wherein in the control, when electronic zoom is in operation, the delay time is set such that the operation of writing the image signal to the memory in the writing and the operation of reading out the image signal from the memory in the reading out end within a period of one frame of the image signal, regardless of the reading region changing.

According to a third aspect of the present invention, there is provided a non-transitory computer-readable storage medium that stores a program for causing a computer to execute each step of a control method for an image capturing apparatus comprising an image capturing unit configured to output, at a predetermined framerate, an image signal obtained by image capture and a memory configured to store the image signal, the control method comprising: writing the image signal to the memory; reading out, in a case where a reading region of the image signal written to the memory changes according to electronic zoom, at least a partial region of the image signal; performing live-view display of an image based on the image signal read out in the reading out; and performing control, for each frame of the image signal, such that an operation of reading out the image signal stored in the memory in the reading out starts after a fixed delay time from a timing at which an operation of writing the image signal to the memory in the writing starts, wherein in the control, while electronic zoom is in operation, the delay time is set such that the operation of writing the image signal to the memory in the writing and the operation of reading out the image signal from the memory in the reading out end within a period of one frame of the image signal, regardless of the reading region changing.

Further features of the present invention will become apparent from the following description of exemplary embodiments with reference to the attached drawings.

BRIEF DESCRIPTION OF THE DRAWINGS

FIG. 1 is a block diagram showing a configuration of an image capturing apparatus according to a first embodiment of the present invention.

FIG. 2 is a diagram illustrating a readout/writing region and a display region of an image in a case where electronic zoom is not used.

FIGS. 3A and 3B are diagrams showing a timing for image readout/writing according to the first embodiment.

FIG. 4 is a diagram illustrating an image readout/writing region and a display region during electronic zoom according to the first embodiment.

FIG. 5 is a diagram showing a timing for image readout/writing in a case where electronic zoom is not used according to a second embodiment.

FIGS. 6A and 6B are diagrams showing a timing for image readout/writing according to a third embodiment.

FIGS. 7A to 7C are diagrams showing a timing for image readout/writing according to a fourth embodiment.

DESCRIPTION OF THE EMBODIMENTS

Embodiments according to the present invention will be described below in detail with reference to the attached drawings.

First Embodiment

FIG. 1 is a block diagram showing a configuration of an image capturing apparatus according to the first embodiment of the present invention. In FIG. 1, reference numeral 200 denotes an image sensor that converts an optical image, which has passed through an optical lens, a diaphragm, and the like that are not shown in the drawings, into an electrical signal, and generates an image signal. Reference numeral 201 denotes an image processing unit that loads the image signal output from the image sensor 200 and applies various types of image processing including noise removal, gamma processing, interpolation processing, matrix conversion processing, and composition processing. Reference numeral 202 denotes a memory writing unit that writes data, which has undergone image processing by the image processing unit 201, to a memory.

Reference numerals 203A and 203B denote VRAMs in which image data pieces 203A-1 and 203B-1 are respectively written by the memory writing unit 202. The memory writing unit 202 can generate VRAMs equal to a plurality of frames in size in the memory. To facilitate description of the present embodiment, it is assumed that the memory writing unit 202 generates, in the memory, the VRAMs 203A and 203B in which one frame worth of image data can be respectively written, and the image data pieces 203A-1 and 203B-1 that correspond to one frame worth of image data are respectively written into the VRAMs 203A and 203B. The memory is a storage unit that temporarily stores image signals, and while a dynamic random access memory (DRAM) that is a volatile memory is used in the present embodiment, other temporary storage means such as a non-volatile memory may be used.

Reference numeral 204 denotes a memory readout unit that alternatingly reads out the image data sets 203A-1 and 203B-1 written in the VRAMs 203A and 203B by the memory writing unit 202. Reference numeral 205 denotes an image magnification unit that performs enlargement processing on a specific region of the image read out by the memory readout unit 204. A display unit 206 displays the image magnified by the image magnification unit 205 on a display device not shown in the drawings. An existing device such as liquid crystal display, a TV monitor, or the like may be used as the display device.

Reference numeral 207 denotes a synchronization signal generation unit. The synchronization signal generation unit 207 generates synchronization signals that regulates the frame rate for image capture and live-view display, and transmits the synchronization signals to the image sensor 200, the display unit 206, and a magnification control unit 208, which is described later. The framerate is a fixed rate regulated to a standard of 30 fps, 60 fps, etc. Reference numeral 208 denotes the magnification control unit. In the case where the user designates the electronic zoom, the magnification control unit 208 receives the synchronization signals transmitted from the synchronization signal generation unit 207 and determines the magnification rate and magnification region on a frame-by-frame basis.

Memory readout/writing and rate control in the case where electronic zoom is not used will be described with reference to FIG. 2. Reference numeral 300 denotes an image region input from the image sensor 200 and written to the memory by the memory writing unit 202. Reference numeral 301 denotes a writing scan performed by the memory writing unit 202 in which image data is written from top to bottom by raster scanning. Reference numeral 310 denotes an image region read out from the memory by the memory readout unit 204. Reference numeral 311 denotes a readout scan performed by the memory readout unit 204 in which raster scanning is performed similar to that of the writing scan 301. Reference numeral 320 denotes display by the display unit 206. In the present embodiment, the size of the display 320 is the same as the size of the image region 310 that is to be read out. Reference numeral 321 denotes a display scan performed by the display unit 206 in which raster scanning is performed similar to that of the writing scan 301.

In FIG. 2, the display scan 321 is required to be performed at the image size and rate prescribed by the display device. The readout scan 311 is performed at a timing that attains the processing rate of the display scan 321. In the case where the size of the display 320 and the readout image size 310 are the same size without electronic zoom having been performed, the readout scan 311 and the display scan 321 can be processed at the same rate. On the other hand, writing is performed at a rate matching the image sensor synchronization signals, as is described later with FIGS. 3A and 3B. In the case where processing is performed at the above-described rate, the writing scan 301 and the readout scan 311 have a predetermined delay time and are thus performed at different timings. Accordingly, it is possible to control access to the same memory region for writing and reading out image data.

FIGS. 3A and 3B are diagrams showing the timing for image readout/writing according to the present embodiment. The timing for image reading out/writing by the memory readout unit 204 and the memory writing unit 202 according to the present embodiment will be described with reference to FIGS. 3A and 3B. FIG. 3A shows the case where electronic zoom is not used, and FIG. 3B shows the timing for reading out/writing during live view operation in the case where electronic zoom is used. Also, in FIGS. 3A and 3B, the horizontal axis indicates time and the vertical axis indicates the vertical direction position of the image in a horizontal line. The vertical axis indicates a horizontal line from the bottom to the top in the direction indicated by the arrow.

In FIG. 3A, reference numeral 100 at fixed intervals denotes synchronization signals of the image sensor 200 generated by the synchronization signal generation unit 207. Reference numeral 101 denotes the writing timing at which the memory writing unit 202 writes image data to the memory. The memory writing unit 202 writes image data line-by-line to the memory from the top to the bottom of the image in accordance with the timing of the image sensor synchronization signals 100. Reference numeral 102 at fixed intervals denotes synchronization signals of the display unit 206 that are generated by the synchronization signal generation unit 207. Reference numeral 103 denotes a memory readout timing at which the memory readout unit 204 reads out image data line-by-line from the top to the bottom of the image in accordance with the display synchronization signals 102. Reference numeral 104 denotes an image region read out by the memory readout unit 204 in the vertical direction. In FIG. 3A, reading and writing are both performed by scanning from the top to the bottom of the image.

Reference numeral 105 denotes a cycle of the image sensor synchronization signals 100. Reference numeral 106 denotes a cycle of the display synchronization signals 102. In FIG. 3A, the cycle 105 of the image sensor synchronization signals 100 and the cycle 106 of the display synchronization signals 102 are the same, but may differ by an integer ratio. For example, in the case where the frame rate for the image sensor synchronization signals 100 is double that of the display synchronization signals 102, the display synchronization signals 102 are to be generated at intervals double that of the image sensor synchronization signals 100. In this case, it is sufficient that the memory readout unit 204 performs readout by thinning out the frames one-by-one with respect to the frames written by the memory writing unit 202.

Reference numeral 107 denotes a phase difference between the image sensor synchronization signals 100 and the display synchronization signals 102 that is a predetermined delay amount in the synchronization signal generation unit 207. In FIG. 3A, the image readout timing 103 can be prevented from overtaking the writing timing 101 by applying the delay amount 107 to the readout timing 103. The delay amount 107 is controlled by the synchronization signal generation unit 207.

Next, FIG. 3B will be described. FIG. 3B shows the case where an image is enlarged by electronic zoom. A partial region of the image rather than the entire image is read out by the enlargement processing that occurs due to the electronic zoom. Reference numeral 110 denotes the image region readout by the memory readout unit 204 in the vertical direction. Reference numeral 111 denotes the center of the enlarged image. FIG. 3B shows the case where the center of the enlarged image and the image center match. At this time, the image displayed by the display unit 206 is an enlarged image, and therefore the region to be read out is not the entire image but a portion of the image. The memory readout unit 204 reads out the image region 104 in FIG. 3A in the case where electronic zoom is not used, and reads out the image region 110 centered around 111 in FIG. 3B in the case where electronic zoom is used for magnification.

In the case where the state shown in FIG. 3B is a state of maximum magnification achieved with electronic zoom, the predetermined delay amount 107 will be a delay amount that guarantees that a readout timing 103A for an image in FIG. 3B does not overtake the writing timing 101. This delay amount 107 is fixed, regardless of the magnification rate of electronic zoom.

In the case where the magnification rate of electronic zoom is not the maximum, the image readout region 110 in FIG. 3B widens, and the slope of the readout timing 103 of an image from the memory becomes larger (becomes steeper) than the slope of the readout timing 103A in FIG. 3B. Therefore, the readout timing 103 for an image does not overtake the writing timing 102 of an image. In other words, by setting the delay amount 107 to a fixed value as shown in FIG. 3B, it is possible to guarantee that the readout timing 103 for an image will not overtake the writing timing 102, and the live-view display of the image can be stabilized, regardless of the magnification rate of the electronic zoom. Furthermore, with the delay amount 107 being fixed, the timings for the image sensor synchronization signals 100 and the display synchronization signals 102 become fixed, the delay time from image capture to display can be stabilized, and the delay time can be reduced to the minimal required time.

Next, control of the rate of image data readout/writing to/from the memory in the case where electronic zoom is used will be described with reference to FIG. 4. Reference numeral 400 denotes an image region output from the image sensor 200 and written to the memory by the memory writing unit 202. Reference numeral 401 denotes a writing scan performed by the memory writing unit 202 and denotes the state where image data is written from the top to the bottom by raster scanning. Reference numeral 410 denotes a readout image region from the image data written in the memory. Reference numeral 410 denotes the readout region in the case where electronic zoom is used, and reference numeral 411 denotes a readout scan. Reference numeral 440 denotes a display region displayed by the display unit 206. Reference numeral 441 denotes a display scan performed by the display unit 206 with raster scanning. The image magnification unit 205 enlarges the image size of the image region 410 to the image size of the display image region 440.

As already described, the display scan 441 is required to be performed at the image size and rate determined by the display scan device. As shown in FIG. 4, the size of the readout image region 410 and the display image region 440 differ, and therefore the rate of the readout scan and the rate of the display scan differ. As shown in FIG. 3B, the timing for starting the readout scan is the same as the display scan, but the readout scan is slower. On the other hand, the timing for starting readout is the same as the timing for starting the display scan, and therefore, in the readout image region 410 in FIG. 4, the delay amount 107 is needed to prevent the readout from overtaking the writing scan 401.

As described above, the delay amount 107 of the image sensor synchronization signals 100 and the display synchronization signals 102 at the maximum magnification rate of electronic zoom is a fixed delay amount that guarantees that the readout timing 103 for the image will not overtake the writing timing 101 for the image. In other words, a fixed delay time is set such that the operation of the memory writing unit 202 writing image signals to the memory and the operation of the memory readout unit 204 reading out image signals from the memory end within the period of one frame of an image signal. Accordingly, even if the magnification rate of electronic zoom has changed, it can be guaranteed that the read out timing 103 for the image will not overtake the writing timing 101, and therefore the timing of the image sensor synchronization signals 100 and the display synchronization signals 102 can be fixed, regardless of the electronic zoom magnification rate. Therefore, the delay time from image capture to live-view display can be stabilized and the delay time can be reduced.

Second Embodiment

Next, the image capturing apparatus of the second embodiment according to the present invention will be described using FIG. 5. In the first embodiment, the delay amount 107 of the timing for image readout is fixed at a fixed value relative to the timing for writing an image to the memory, regardless of whether or not electronic zoom is used. In contrast to this, in the second embodiment, the delay amount is switched depending on whether or not electronic zoom is used. In the present embodiment, the delay amount of the timing for image readout relative to the timing for image writing to the memory is controlled with the view of minimizing the live-view display delay amount in the case where electronic zoom is not used.

FIG. 5 is a diagram showing the timing for reading out/writing of an image by the memory readout unit 204 and the memory writing unit 202 according to the second embodiment. In the case where electronic zoom is not performed, the delay amount for the image sensor synchronization signals and the display synchronization signals can be minimized. In FIG. 5, reference numeral 500 denotes image sensor synchronization signals that are generated at fixed intervals. Reference numeral 501 denotes the writing timing at which the memory writing unit 202 performs writing. Reference numeral 502 denotes display synchronization signals at fixed intervals. Reference numeral 503 denotes the readout timing for the memory readout unit 204 to read out image data from the memory. Reference numeral 504 denotes an image region read out by the memory readout unit 204 from the memory in the vertical direction.

In FIG. 5, reading out and writing of an image are both performed by scanning from the top to the bottom of the image.

Reference numeral 505 denotes a cycle of the image sensor synchronization signals 500. Reference numeral 506 denotes a cycle of the display synchronization signals 502. Reference numeral 507 denotes a phase difference between the image sensor synchronization signals 500 and the display synchronization signals 502 that is a predetermined delay amount of the synchronization signal generation unit 207. In FIG. 3A, the delay amount 107 is set in consideration of electronic zoom being applied, but in FIG. 5, a delay amount is only set in a case where electronic zoom is not performed. In the case where electronic zoom is not used, the readout timing 503 for the image can be prevented from overtaking the writing timing 501 by applying the minimum delay amount 507. The delay amount 507 is controlled by the synchronization signal generation unit 207.

If electronic zoom is switched to be in use or not to be in use according to the image capture mode set by user operations, the delay amount 107 described in FIG. 3 of the first embodiment is used in the case where electronic zoom is used. Also, the delay amount 507 shown in FIG. 5 is used in the case where electronic zoom is not used. In this way, by switching the delay amount in correlation with the image capture mode, the delay time from image capture to display can be stabilized, and the delay time can be minimized according to whether or not electronic zoom is used.

Furthermore, even in the case where the maximum magnification rate of electronic zoom is switched, it is conceivable that the delay amount for the maximum magnification rates will switch to the minimal delay amount 107 shown in FIG. 3B. Accordingly, even in the case where the maximum magnification rate of electronic zoom is switched, by switching the delay amount to the delay amount 107 in correlation with the switching of the maximum magnification rate, the delay time from image capture to display can be stabilized, and the delay time can be minimized.

Third Embodiment

Next, the image capturing apparatus of the third embodiment according to the present invention will be described using FIGS. 6A and 6B. In the first embodiment, the time determined by the required phase difference at the maximum magnification rate of electronic zoom was the fixed delay amount 107. In contrast to this, in the third embodiment, the delay amount is fixed regardless of the maximum magnification rate of electronic zoom. In the present embodiment, control is performed with the view of reducing the display delay amount and stabilizing the live-view display regardless of the functions of the product and image capture mode.

FIGS. 6A and 6B are diagrams showing the timing for image reading out/writing by the memory readout unit 204 and the memory writing unit 202 according to the third embodiment. FIG. 6A shows an example of a fixed delay amount that is not dependent on the difference between the maximum magnification rate of electronic zoom and the timing for memory writing. Reference numeral 600 in FIG. 6A denotes image sensor synchronization signals at fixed intervals. Reference numeral 601 denotes timing at which the memory writing unit 202 writes an image. Reference numeral 602 denotes display synchronization signals at fixed intervals. Reference numeral 603 denotes readout timing for the memory readout unit 204 to read out the image from the memory. Reference numeral 605 denotes a cycle of the image sensor synchronization signals 600. Reference numeral 606 denotes a cycle of the display synchronization signals 602.

In FIG. 6A, the cycle 605 of the image sensor synchronization signals 600 and the cycle 606 of the display synchronization signals 602 are the same, but may differ by an integer ratio. For example, in the case where the image sensor synchronization signals 600 have a frame rate that is double that of the display synchronization signals 602, the display synchronization signals 602 will be generated at intervals double that of the image sensor synchronization signals 600. In this case, it is sufficient that the memory readout unit 204 performs readout by thinning out the frames one-by-one with respect to the frames written by the memory writing unit 202.

Reference numeral 607 denotes a phase difference between the image sensor synchronization signals 600 and the display synchronization signals 602 that is a predetermined delay amount. In the example in FIG. 6A, the delay amount 607 is a period that is half of the cycle 605 of the image sensor synchronization signals 600. Accordingly, in the case where the center of the image enlarged by electronic zoom matches the image center, the readout timing 603 for the image can be prevented from overtaking the writing timing 601, regardless of the maximum magnification rate of electronic zoom. The delay amount 607 is controlled by the synchronization signal generation unit 207.

Also, FIG. 6B shows an example of a fixed delay amount that is not dependent on the maximum magnification rate of electronic zoom. Reference numeral 610 in FIG. 6B denotes image sensor synchronization signals at fixed intervals. Reference numeral 611 denotes writing timing for the memory writing unit 202 to write an image to the memory. Reference numeral 612 denotes display synchronization signals at fixed intervals. Reference numeral 613 denotes readout timing for the memory readout unit 204 to read out the image from the memory. Reference numeral 615 denotes a cycle of the image sensor synchronization signals 610. Reference numeral 616 denotes the cycle of the display synchronization signals 612. In FIG. 6B, the cycle 615 of the image sensor synchronization signals 610 and the cycle 616 of the display synchronization signals 612 are the same, but may differ by an integer ratio.

Reference numeral 617 denotes a phase difference between the synchronization signals 610 from the image sensor and the display synchronization signals 612 that is a predetermined delay amount. Reference numeral 618 denotes the writing period taken from the image writing timing 611 to write an image to the memory. In the example in FIG. 6B, the delay amount 617 is a period that is half of the memory writing period 618. Accordingly, in the case where the center of the image enlarged by electronic zoom and the image center match, the readout timing 603 for the image can be prevented from overtaking the writing timing 601, regardless of the maximum magnification rate of electronic zoom. The delay amount 617 is controlled by the synchronization signal generation unit 207.

In this way, if the delay amount 607 is set as described above, in the case where the center of the image enlarged by electronic zoom and the image center match, the delay amount 607 can be fixed, regardless of the difference between the maximum magnification rate of electronic zoom and the timing for memory writing. Then, the delay time from image capture to display can be stabilized and the delay time can be reduced.

Also, if the delay amount 617 is set as described above, in the case where the center of the image enlarged by electronic zoom and the image center match, the delay amount 617 can be fixed, regardless of the difference between the maximum magnification rate of electronic zoom and the timing for memory writing. Then, the delay time from image capture to display can be stabilized and the delay time can be reduced.

Fourth Embodiment

Next, the image capturing apparatus of the fourth embodiment according to the present invention will be described using FIGS. 7A to 7C. In the first embodiment, an example was described in which the center of an image enlarged by electronic zoom and the image center matched, but in the fourth embodiment, examples will be described in which the center of an image enlarged by electronic zoom is not the image center. In the first embodiment, the required delay amount at the maximum magnification rate of electronic zoom determined the predetermined delay amount 107, but in the fourth embodiment, a predetermined delay amount is determined considering the magnification rate of electronic zoom and the center position of electronic zoom.

FIGS. 7A to 7C are figures that show image timing for reading out/writing by the memory readout unit 204 and the memory writing unit 202 in cases where the central position of electronic zoom differs. FIG. 7A shows the case where the image center enlarged by electronic zoom matches the image center, FIG. 7B shows the case where the center of the image enlarged by electronic zoom is above the image center, and FIG. 7C shows the case where the center of the image enlarged by electronic zoom is below the image center. Here, the states shown in FIGS. 7A to 7C are all states indicating the maximum magnification rate for electronic zoom. Also, the center of the image enlarged by electronic zoom does not reach a position above FIG. 7B and the center of the image enlarged by electronic zoom does not reach a position below FIG. 7C.

Reference numeral 700 in FIG. 7A denotes image sensor synchronization signals at fixed intervals. Reference numeral 701 denotes writing timing at which the memory writing unit 202 writes an image to the memory. Reference numeral 702 denotes display synchronization signals at fixed intervals. Reference numeral 703 denotes readout timing for the memory readout unit 204 to read out an image from the memory. Reference numeral 704 denotes an image region written by the memory writing unit 202 to the memory in the vertical direction. The image is scanned from top to bottom at the memory writing timing 701.

Reference numeral 705 denotes a cycle of the image sensor synchronization signals 700. Reference numeral 706 denotes a cycle of the display synchronization signals 702. Reference numeral 707 denotes a phase difference between the image sensor synchronization signals 500 and the display synchronization signals 502 that is a predetermined delay amount for the synchronization signal generation unit 207. Reference numeral 708 in FIG. 7A denotes an image region read out by the memory readout unit 204 from the memory in the vertical direction. Reference numeral 709 denotes a center of an image enlarged by electronic zoom and is the center of the image region 704 written in FIG. 7A.

Reference numeral 718 in FIG. 7B denotes an image region read out by the memory readout unit 204 from the memory in the vertical direction. Reference numeral 719 denotes a center of an image enlarged by electronic zoom. The readout region 718 is closer to the upper edge of the image region 704 in FIG. 7A than the readout region 708 is. Also, the center 719 of the image enlarged by electronic zoom is located higher than the center of the image region 704 and the center 709 of the image enlarged by electronic zoom in FIG. 7A. In other words, the case where the center of the image enlarged by electronic zoom and the region are nearer to the upper side of the image are shown. That is to say, FIG. 7B shows the case where the magnification rate of electronic zoom is at the maximum and the enlarged region is nearer to the upper most side.

Reference numeral 728 in FIG. 7C denotes an image region read out by the memory readout unit 204 from the memory in the vertical direction. Reference numeral 729 denotes a center of an image enlarged by electronic zoom. The readout region 728 is closer to the lower edge of the image region 704 than the readout region 708 is in FIG. 7A. Also, the center 729 of the image enlarged by electronic zoom is also located lower than the center of the image region 704 and the center 709 of the image enlarged by electronic zoom in FIG. 7A. In other words, cases where the center of the image enlarged by electronic zoom and the region are nearer to the bottom of the image are shown. That is to say, FIG. 7C shows the case where the magnification rate of electronic zoom is at the maximum and the enlarged region is nearer to the lower most side.

When considering a delay amount that prevents the readout timing 703 of the image from overtaking the writing timing 701, the largest delay amount is required in the case of FIG. 7C. The delay amount 707 will be a delay amount that prevents the readout timing 703 for the image from overtaking the writing timing 701 in FIG. 7C. Accordingly, the fixed delay amount 707 can be determined as a fixed delay amount that prevents the readout timing 703 for the image from overtaking the writing time 701, regardless of the magnification rate of electronic zoom and the center position of the image enlarged by electronic zoom. The delay amount 707 is controlled by the synchronization signal generation unit 207.

As described above, in the present embodiment, in the case where the region enlarged by electronic zoom and the center position of the enlarged image at the maximum magnification rate for electronic zoom are nearer to the lower most side, the required delay amount will be the predetermined delay amount 707. Accordingly, the fixed delay amount 707 can guarantee that the readout timing 703 for the image is prevented from overtaking the writing time 701, regardless of the magnification rate of electronic zoom and the center position of the image enlarged by electronic zoom. For this reason, the timing for the image sensor synchronization signals 700 and the display synchronization signals 702 can be fixed, regardless of the electronic zoom magnification rate and the center position of the image enlarged by electronic zoom, the delay time from image capture to display can be stabilized, and the delay time can be reduced.

Note that the present embodiment is an example of a case where an image is scanned from top to bottom, and the opposite of this is the case where scanning is performed from bottom to top. However, the delay amount 707 is determined in the same manner. In this case, it is sufficient that the delay amount 707 be a delay amount required for the case where the electronic zoom magnification rate is at the maximum and the center is the nearest to the upper most side.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-027944, filed Feb. 16, 2015 which is hereby incorporated by reference herein in its entirety.

What is claimed is:

1. An image capturing apparatus comprising:
   an image sensor configured to output, at a predetermined framerate, an image signal obtained by image capture;
   a memory configured to store the image signal;
   an image signal writer configured to write the image signal to the memory;
   an image signal reader configured to, in a case where a readout region of the image signal written in the memory changes according to electronic zoom, read out at least a partial region of the image signal;
   a display configured to perform live-view display of an image based on the image signal read out by the image signal reader;
   a memory access controller configured to perform control, for each frame of the image signal, such that an operation of the image signal reader reading out the image signal stored in the memory starts after a fixed delay time from a timing at which an operation of the image signal writer writing the image signal to the memory starts; and
   a zoom controller configured to control a zoom magnification rate of the electronic zoom,
   wherein the memory access controller sets the fixed delay time according to a maximum magnification rate that is controllable by the zoom controller, such that the operation of the image signal writer writing the image signal to the memory and the operation of the image signal reader reading out the image signal from the memory end within a period of one frame of the image signal, regardless of the reading region changing by the electronic zoom, and wherein the fixed delay time is fixed regardless the zoom magnification rate of the electronic zoom.

2. The image capturing apparatus according to claim 1, wherein the memory access controller, when electronic zoom is not in operation, sets a time period that is shorter than the fixed delay time set when electronic zoom is in operation as a delay time.

3. The image capturing apparatus according to claim 1, wherein the memory access controller sets the delay time according to a position of the partial region of the image signal to be read out by the image signal reader in relation to the overall image signal.

4. The image capturing apparatus according to claim 1, wherein the memory access controller sets the fixed delay time to be a time period that is half of the time taken by the image signal writer to write one frame of the image signal to the memory.

5. The image capturing apparatus according to claim 1, wherein there are two memories, and the operation of the image signal writer writing the image signal and the operation of the image signal reader reading out the image signal are performed alternatingly with respect to the two memories in units of one frame of the image signal.

6. A control method for an image capturing apparatus comprising an image sensor configured to output, at a predetermined framerate, an image signal obtained by image capture and a memory configured to store the image signal, the method comprising:

writing the image signal to the memory;

reading out, in a case where a reading region of the image signal written in the memory changes according to electronic zoom, at least a partial region of the image signal;

performing live-view display of an image based on the image signal read out in the reading out;

performing control, for each frame of the image signal, such that an operation of reading out the image signal stored in the memory in the reading out starts after a fixed delay time from a timing at which an operation of writing the image signal to the memory in the writing starts; and controlling a zoom magnification rate of the electronic zoom, wherein in the performing control, the fixed delay time is set according to a maximum magnification rate that is controllable by the controlling, such that the operation of writing the image signal to the memory in the writing and the operation of reading out the image signal from the memory in the reading out end within a period of one frame of the image signal, regardless of the reading region changing in the electronic zoom, and wherein the fixed delay time is fixed regardless the zoom magnification rate of the electronic zoom.

7. A non-transitory computer-readable storage medium that stores a program for causing a computer to execute each step of a control method for an image capturing apparatus comprising an image sensor configured to output, at a predetermined framerate, an image signal obtained by image capture and a memory configured to store the image signal, the method comprising:

writing the image signal to the memory;

reading out, in a case where a reading region of the image signal written in the memory changes according to electronic zoom, at least a partial region of the image signal;

performing live-view display of an image based on the image signal read out in the reading out;

performing control, for each frame of the image signal, such that an operation of reading out the image signal stored in the memory in the reading out starts after a fixed delay time from a timing at which an operation of writing the image signal to the memory in the writing starts; and controlling a zoom magnification rate of the electronic zoom, wherein in the performing control, the fixed delay time is set according to a maximum magnification rate that is controllable by the controlling, such that the operation of writing the image signal to the memory in the writing and the operation of reading out the image signal from the memory in the reading out end within a period of one frame of the image signal, regardless of the reading region changing in the electronic zoom, and wherein the fixed delay time is fixed regardless the zoom magnification rate of the electronic zoom.

\* \* \* \* \*